(12) United States Patent
Sankey et al.

(10) Patent No.: US 7,044,396 B2
(45) Date of Patent: May 16, 2006

(54) MULTI-LAYER POLYMERIC FILM AND THE USE THEREOF

(75) Inventors: Stephen William Sankey, Great Smeaton (GB); Julia Elizabeth Friend, Stockton-on-Tees (GB)

(73) Assignee: DuPont Teijin Films US Limited Partnership, Wilmington, DE (US)

(*) Notice: Subject to any disclaimer, the term of this patent is extended or adjusted under 35 U.S.C. 154(b) by 458 days.

(21) Appl. No.: 10/204,892

(22) PCT Filed: Feb. 22, 2001

(86) PCT No.: PCT/US01/05903

§ 371 (c)(1),
(2), (4) Date: Dec. 17, 2002

(87) PCT Pub. No.: WO01/62496

PCT Pub. Date: Aug. 30, 2001

(65) Prior Publication Data

US 2006/0065749 A1    Mar. 30, 2006

(30) Foreign Application Priority Data

Feb. 22, 2000    (GB) .................................. 0004170

(51) Int. Cl.
    *G06K 19/06* (2006.01)
(52) U.S. Cl. .................. 235/494; 235/454; 235/462.01
(58) Field of Classification Search ............... 235/454, 235/494, 487; 270/1.02

See application file for complete search history.

(56) References Cited

U.S. PATENT DOCUMENTS

| 3,959,799 | A  | * | 5/1976 | Gambino et al. ........... 430/524 |
| 5,085,417 | A  | * | 2/1992 | Copham .................... 270/1.02 |
| 6,595,427 | B1 | * | 7/2003 | Soni et al. .................. 235/491 |

FOREIGN PATENT DOCUMENTS

| EP | 0 426 409 A2 | 5/1991 |
| EP | 0 565 281 A2 | 10/1993 |
| JP | 1082935 | 3/1989 |
| JP | 4110148 | 4/1992 |
| JP | 6000859 A | 1/1994 |
| JP | 8290539 | 11/1996 |
| JP | 11162031 | 6/1999 |
| WO | WO 99/17288 | 4/1999 |
| WO | WO 99/36262 | 7/1999 |

* cited by examiner

*Primary Examiner*—Karl D. Frech
*Assistant Examiner*—Jamara A. Franklin
(74) *Attorney, Agent, or Firm*—RatnerPrestia (57) ABSTRACT

The use of a multilayer film to store or retrieve information, said information being correlated to the multilayer structure of the film, and said multilayer film comprising at least two different types of layer, wherein each type of layer exhibits a different optical property and wherein the multilayer film comprises a plurality of layers of each of at least two of the different types of layer; a method of storing information, a method of retrieving stored information and a method of protecting against counterfeiting or fraud, which method utilizes said multilayer film.

53 Claims, 3 Drawing Sheets

MULTI-LAYER POLYMERIC FILM AND THE USE THEREOF

BACKGROUND OF THE INVENTION

This invention relates to the use, in the storage and retrieval of information, of a multilayer film comprising different types of layers which are distinguishable on the basis of their different optical properties. The multilayer film has application as an anti-counterfeit device.

Counterfeiting is a problem that is growing world wide and is costing the global economy over $250 billion a year. Many products are affected including credit cards, documents, apparel, videos, auto parts and aircraft parts.

One commonly used device for storing information is the barcode. It is known that barcodes may be expressed as mathematical code when optically scanned using appropriate equipment and software. Hand-held scanners are typically used. This mathematical code can then be correlated with a code stored in a database for retrieval of the desired information or for verification purposes. The database may be a local database situated at the point of scanning or it may be located remotely and accessed according to known means of telecommunication. One disadvantage of the barcode is that because the structure of the barcode is readily discernible, it is easily reproducible. For this reason, a conventional optically-scanned barcode is not particularly suitable for use as an anti-counterfeit device.

Many other existing anti-counterfeiting techniques, such as holograms, rely on methods that are visible to the human eye. It would be desirable to provide a technique involving a code which is invisible to or indiscernible by the naked eye and therefore much more difficult to copy. One fairly recent development in high security applications involves sub-surface laser marking within a label. Although this method provides a high degree of security, it involves a relatively complicated and complex process of production and data retrieval.

Polyester film is already used as a substrate for cards and label applications. A security feature present as an integral feature of the film would enhance the utility of polyester film in such applications. A polyester film within which is embedded a code that is invisible to the naked eye would have particular utility in such applications.

The preparation of multilayer films is known. U.S. Pat. No. 3,647,612 discloses a process for the preparation of a multilayer film which involves providing two or more streams of thermoplastic material, arranging the two or more streams into a single stream having a plurality of generally parallel layers, mechanically manipulating the stream by dividing and recombining to provide an increased number of layers and then forming the stream into a thin sheet or film. The layers are composed of resinous material which is transparent to visible light, the multilayer film structure having an iridescent appearance. EP-0426636 also discloses multilayer coextruded light-reflecting films comprising a plurality of generally parallel layers of transparent thermoplastic resinous material.

EP-0592284 discloses a tear-resistant multilayer film comprising alternating layers of stiff and ductile polymeric materials which may be useful as a laminate for shatter-proofing a glazing member.

U.S. Pat. No. 5,759,467 discloses a multilayer polyester film which comprises a plurality of alternating layers of terephthalic acid polyester and naphthalene dicarboxylic acid polyester. The film has increased tensile strength and is taught as being of use in, inter alia, magnetic media substrates.

EP-0492894 discloses a method and apparatus for the production of a multilayer film by generating interfacial surfaces in a fluid mass. The method comprises the steps of dividing a first composite stream into at least two branch streams, repositioning the branch streams, expanding symmetrically along one axis, contracting symmetrically along another axis and recombining the branch streams into a second composite stream which comprises a greater number of discrete layers of polymeric material than the first composite stream, wherein the expansion and contraction steps are conducted either on the individual branch streams or on the second composite stream.

WO-98/06587 discloses a polyester film having an opaque, preferably black, core layer having an optical density greater than 2.0 and on both surfaces thereof a white outer layer for use as a photographic sheet or other imaging applications. For similar uses, WO-98/07068 discloses a polyester film having an opaque, preferably black, first layer having an optical density greater than 2.0 and a white second layer.

It is an object of the invention to provide a convenient and inexpensive technique for combating fraud which offers a high level of security and which has a high resistance to counterfeiting.

SUMMARY OF THE INVENTION

According to the present invention there is provided the use of a multilayer film to store or retrieve information, said information being correlated to the multilayer structure of the film, and said multilayer film comprising at least two different types of layer, wherein each type of layer exhibits a different optical property and wherein the multilayer film comprises a plurality of layers of each of at least two of the different types of layer.

BRIEF DESCRIPTION OF DRAWINGS

The invention is illustrated by reference to the following figures in which.

DETAILED DESCRIPTION OF THE DISCLOSURE

In a preferred embodiment, the difference in the optical properties of each type of layer relates to the different reflectivity of each type of layer to light incident thereupon, i.e. the layers of one type are relatively more reflective to light incident thereupon than the layers of another type. The difference in relative reflectivity may relate to any wavelength or range of wavelengths of electromagnetic radiation. Wavelengths in the visible and ultraviolet region, or parts thereof, of the electromagnetic spectrum are of particular interest. Thus, in a preferred embodiment, the layers of each type exhibit differences in relative reflectivity to visible light (or a selected wavelength or range of wavelengths thereof) or differences in relative reflectivity to ultraviolet light (or a selected wavelength or range of wavelengths thereof). In an alternative embodiment, the layers of each type exhibit differences in relative reflectivity to plane-polarised light.

In an alternative embodiment, the difference in the optical properties of each type of layer relates to the different fluorescence of each type of layer, i.e. the layers of one type are relatively more fluorescent than the layers of another type.

It is preferred that the difference in optical properties is the difference in relative reflectivity of light in the visible region of the electromagnetic spectrum. It is particularly preferred that the layers of each type exhibit differences in their relative reflectivity to substantially all wavelengths of visible light incident thereupon.

There is no upper limit on the number of layers in the film and it is possible to manufacture films having in excess of 1000 layers.

Films having fewer layers, however, equally meet the objects of the invention. In one embodiment, the number of layers is from 4 to 100, preferably from 6 to 80, more preferably from 8 to 50, and particularly from 10 to 30.

In a preferred embodiment, the multilayer film comprises only two different types of layer, i.e. a plurality of layers of type A and a plurality of layers of type B wherein the layers of type A exhibit optical properties which are different and distinguishable from the optical properties of the layers of type B. The number of layers of each type in the film is from 2 to over 1000.

In a particularly preferred embodiment, the multilayer film comprises only two different types of layer, type A and type B, distinguishable from each other on the basis of their relative reflectivities of light incident thereupon. In this embodiment, a layer of type A preferably reflects more than 50%, preferably more than 65%, preferably more than 80%, preferably more than 90%, preferably more than 95%, and preferably more than 99%, of light incident thereupon, and a layer of type B preferably reflects less than 50%, preferably less than 65%, preferably less than 80%, preferably less than 90%, preferably less than 95%, and preferably less than 99%, of light incident thereupon. In this embodiment, it is preferred that a layer of type B absorbs more than 50%, preferably more than 65%, preferably more than 80%, preferably more than 90%, preferably more than 95%, and preferably more than 99%, of light incident thereupon.

The multilayer film therefore comprises a series of layers which are distinguishable on the basis of their optical properties when the film is viewed in cross-section along an edge thereof. As noted above, a barcode may be expressed as mathematical code when optically scanned using the appropriate equipment and software. In a corresponding manner, a multilayer film structure is also capable of being expressed as mathematical code when optically scanned using the appropriate equipment and software. Accordingly, multilayer film is capable of being read and interrogated by optical scanning using an electronic scanner in a similar manner to a conventional barcode. Thus, multilayer film may be interrogated for retrieval of the code held within it and the code correlated with information held in a database for verification of authenticity or retrieval of information.

A standard barcode generally comprises alternating white and black strips each of variable width. Similarly, the "barcode" held in the cross-section of multilayer film comprises layers which are optically-distinguishable from adjacent layers of the film. The thickness of each layer in the film is, of course, variable in the same way as the alternating white and black strips in a conventional barcode are of variable width. A layer which is optically distinguishable from adjacent layers may consist of a single discrete layer or it may be composed of a plurality of individual layers each having the same optical property.

The total thickness of the multilayer film for use in the present invention is preferably in the range from about 5 µm to about 5 mm, preferably from about 5 µm to about 1 mm, preferably from about 5 µm to about 500 µm, more preferably from about 12 µm to about 350 µm, and particularly from about 30 µm to about 200 µm. The dimensions of the "barcode" which the film holds in its cross-section are therefore much smaller than the dimensions of a conventional optically-scanned barcode. The structure of the "barcode" of the multilayer film, and the information held therein, would therefore be much more difficult, if not impossible, to reproduce since there are few sites worldwide equipped to produce multilayer polyester films.

In addition, the small dimensions mean that the "barcode" in the cross-section of the multilayer film and the information held therein would be much more difficult to access without specialist equipment. In the embodiments of the invention which depend on differences in optical properties in the visible region of light of each layer, the discrete layers of the multilayer film would not normally be visible to the naked eye.

The multilayer film used in the present invention can therefore contain a code or fingerprint and is suitable for use in applications in which a high level of security is required. The present invention could therefore have wide-ranging applications in security and anti-fraud methods, such as in banknotes, passports, identity cards, entry cards, bank and credit cards, labels for high quality goods, packaging and any other application in which it is required to encode security information or in which the origin of goods or services is of importance and value. The multilayer film used in the present invention would have advantages over, for instance, sub-surface laser marking within a security label in that the process of production and the process of data retrieval would be less costly and more efficient.

Moreover, polyester film is already used as a substrate for security cards and label applications, as noted above. The multilayer film used in the present invention would therefore function both as a substrate and also as the security device itself, thereby reducing costs. In addition to the improved efficiency and economy of manufacture, the present invention also provides an advantage in terms of an increased level of security. As noted above, there are few sites worldwide equipped to produce multilayer films. Furthermore, in relation to a security system which is an "additive" system, i.e. wherein the security device is applied to or incorporated into an article such as an identity or credit card, the unitary method of manufacture of an integral substrate/security device according to the present invention reduces the risk of the security device, or the code therein, becoming available by theft or inadvertant disclosure.

The layers of the multilayer film may be formed from any film-forming material, such as a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly an aliphatic or cycloaliphatic glycol, eg ethylene glycol, 1,3-propanediol, 1,4-butanediol, neopentyl glycol and 1,4-cyclohexanedimethanol. An aliphatic glycol is preferred. Polyethylene terephthalate or polyethylene naphthalate is the preferred polyester. Polyethylene terephthalate is particularly preferred.

In a preferred embodiment of the invention each type of layer of the multilayer film comprises the same material, preferably the same polyester. Preferably, the materials comprising the various layers are processable at the same temperature and have similar melt viscosities so as to avoid degrading a lower melting material. Accordingly, residence time and processing temperatures may have to be adjusted depending on the characteristics of the materials of each layer. It is also preferred that the layers comprise crystalline and/or semi-crystalline polyester material.

The layers of each type in the multilayer film may be uniaxially oriented, but are preferably biaxially oriented by drawing in two mutually perpendicular directions in the plane of the film to achieve a satisfactory combination of mechanical and physical properties. Orientation may be effected by any process known in the art for producing an oriented film, for example a tubular or flat film process.

In a tubular process, simultaneous biaxial orientation may be effected by extruding a thermoplastics polyester tube which is subsequently quenched, reheated and then expanded by internal gas pressure to induce transverse orientation, and withdrawn at a rate which will induce longitudinal orientation.

In the preferred flat film process, the layer-forming polyester is extruded through a slot die and rapidly quenched upon a chilled casting drum to ensure that the polyester is quenched to the amorphous state. Orientation is then effected by stretching the quenched extrudate in at least one direction at a temperature above the glass transition temperature of the polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is effected to an extent determined by the nature of the polyester, for example polyethylene terephthalate is usually stretched so that the dimension of the oriented film is from 2 to 5, more preferably 2.5 to 4.5 times its original dimension in the or each direction of stretching. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional restraint at a temperature above the glass transition temperature of the polyester but below the melting temperature thereof, to induce crystallisation of the polyester. In applications where film shrinkage is not of significant concern, the film may be heat set at relatively low temperatures or not at all. On the other hand, as the temperature at which the film is heat set is increased, the tear resistance of the film may change. Thus, the actual heat set temperature and time will vary depending on the composition of the film and its intended application but should not be selected so as to substantially degrade the tear resistant properties of the film. Within these constraints, a heat set temperature of about 135° to 205° C. is generally desirable.

Formation of a multilayer film may be effected by any of the techniques known in the art. Conveniently, however, formation of a composite film is effected by coextrusion, either by simultaneous coextrusion of the respective film-forming layers through independent orifices of a multi-orifice die, and thereafter uniting the still molten layers, or, preferably, by single-channel coextrusion in which molten streams of the materials of the respective film-forming layers are first united within a channel leading to a die manifold, and thereafter extruded together from the die orifice under conditions of streamline flow without intermixing.

One such technique is disclosed in U.S. Pat. No. 3,565, 985 (Schrenk el al.). In making the multilayer films, melt coextrusion by either the multi-manifold die or the feedblock method in which individual layers meet under laminar flow conditions to provide an integral multilayer film may be used. More specifically, separate streams of the materials of each layer in a flowable state are each split into a predetermined number of smaller sub-streams. These smaller streams are then combined in a predetermined pattern of layers to form an array of layers of these materials in a flowable state. Each layer is in intimate contact with adjacent layers in the array. This array generally comprises a tall stack of layers which is then compressed to reduce its height. In the multi-manifold die approach, the film width remains constant during compression of the stack while the width is expanded in the feedblock approach. In either case, a comparatively thin, wide film results. Layer multipliers in which the resulting film is split into a plurality of individual subfilms which are then stacked one upon another to increase the number of layers in the ultimate film may also be used.

In one embodiment the preparation of the multilayer films may be effected using layer multipliers on a composite stream comprising discrete layers of co-extruded polymeric material, as described below and in FIG. 1, wherein the z-axis is the direction of flow of a first composite stream, the x-axis extends transversely of the first composite stream along a transverse dimension of the layer interface, and the y-axis extends perpendicularly away from the layer interface in the direction of the thickness of the layers of the first composite stream:

(1) expansion in the x-direction of a first composite stream comprising co-extruded, discrete layers of polymeric material, wherein the interface between the layers lies in the x-z plane;

(2) division of the first composite stream along the x-axis into multiple branch streams;

(3) re-orientation of the branch streams as they flow along the z-axis so that they are stacked along the y-axis;

(4) recombination of the branch streams to form a second composite stream; and (5) contraction of the second composite stream along the y axis.

The layer-multiplication apparatus is positioned after the different polymers have been combined in a co-extrusion block. After the melt leaves the layer multiplier, it passes through a die and is then manufactured into a film with the desired crystallinity. The process may be performed using any number of extruders to provide a first composite stream, as required. The first composite stream may also undergo layer multiplication using more than one layer multiplier, arranged in series or in parallel.

Other manufacturing techniques such as lamination, coating or extrusion coating may be used in assembling multilayer films. For example, in lamination, a plurality of preformed layers having the requisite differences in optical properties are brought together under temperature and/or pressure (e.g. using heated laminating rollers or a heated press) to adhere adjacent layers to each other. The films may also be manufactured by successive casting of one or more layer(s) onto one or more preformed layer(s). Extrusion coating may be preferred over the melt coextrusion process described above where it is desirable to pretreat selected layers of the multilayer film or where the materials are not readily coextrudable. In extrusion coating, a first layer is extruded onto either a cast web, a monoaxially oriented film or a biaxially oriented film and subsequent layers are sequentially coated onto the previously provided layers. Exemplary of this method is U.S. Pat. No. 3,741,253.

In the manufacture of the multilayer films, any combination of the above process techniques may be adopted. For example, the use of more than two extruders and the lamination of two or more co-extruded films would enable the production of films having a more complicated structure, which would therefore be capable of storing more sophisticated codes.

The respective layers of the multilayer films need not be continuous layers. Thus, a given layer may be continuous or non-continuous throughout the film. The primary requirement is that a given layer must be optically distinguishable from the adjacent layer(s) in order that the cross-section of the film may be capable of representation in mathematical code.

In a preferred embodiment, the multilayer film comprises a plurality of white layers and a plurality of dark layers.

The term "white layer" as used herein means a type of layer which is relatively more reflective of light, preferably light of substantially all wavelengths in the visible region of the electromagnetic spectrum, than other types of layer present in the multilayer film. The term "dark layer" as used herein means a type of layer which is relatively less reflective of light, preferably light of substantially all wavelengths in the visible region of the electromagnetic spectrum, than other types of layer present in the multilayer film. In a preferred embodiment, the term "dark layer" as used herein means a type of layer which is relatively more absorptive or more transmissive, preferably more absorptive, of light, preferably light of substantially all wavelengths in the visible region of the electromagnetic spectrum, than other layers in the multilayer film.

In a preferred embodiment, the term "white layer" as used herein means a layer which reflects substantially all wavelengths in the visible region of the electromagnetic spectrum of light incident thereupon, and the term "dark layer" as used herein means a layer which absorbs substantially all wavelengths in the visible region of the electromagnetic spectrum of light incident thereupon.

The following description is directed to the preferred embodiment of the invention which is concerned with the absorption and reflection, respectively, of visible light by dark and white layers of the multilayer film of the present invention. However, it is stressed that the particular film described in the following passages in detail is intended only to exemplify the principle of the invention and that the invention is not to be limited to films of such type.

The dark layer is opaque, by which is meant that it exhibits a Transmission Optical Density (TOD), measured as described herein, of greater than 2.0, preferably in the range from 2.5 to 10, more preferably 3.0 to 7.0, particularly 3.5 to 6.0, and especially 4.5 to 5.5. The aforementioned TOD ranges are particularly applicable to a 20 μm thick dark layer. The dark layer is conveniently rendered opaque by the incorporation therein of an effective amount of an opacifying agent, such as carbon black, or a metallic filter such as aluminium powder. Carbon black is a particularly preferred opacifying agent, especially carbon black known as Furnace type carbon black.

The dark layer preferably comprises in the range from 0.05% to 10%, more preferably 1% to 7%, particularly 2% to 6%, and especially 3% to 5% of opacifying agent, by weight based on the weight of the first layer polyester. The opacifying agent, preferably of carbon black suitably has a mean particle diameter in the range from 0.005 to 10 μm, more preferably 0.01 to 1.5 μm, especially 0.015 to 0.1 μm, and particularly 0.02 to 0.05 μm.

The opacifying agent preferably has a BET surface area, measured according to conventional techniques known in the art, in the range from 20 to 300, more preferably 50 to 200, and particularly 110 to 160 $m^2gm^{-1}$.

The dark layers are suitably grey, or preferably black, the external surface thereof more preferably exhibiting a CIE laboratory colour co-ordinate L* value in the range from 10 to 60, more preferably 15 to 50, particularly 20 to 40, and especially 25 to 35.

In one embodiment of the invention, the dark layers additionally comprise at least one whitening agent, as described below. It is preferred that a dark layer comprises the same whitening agent(s) as is present in a white layer, i.e. the dark layers and the white layers preferably comprise at least one common whitening agent, preferably barium sulphate. The dark layers preferably comprise in the range from 5% to 95%, more preferably 10% to 70%, particularly 20% to 50%, and especially 25% to 35% by weight of whitening agent, preferably barium sulphate, relative to the weight of the same whitening agent present in the white layers.

The thickness of a dark layer is preferably in the range from 0.1 to 50 μm, more preferably 0.2 to 20 μm, particularly 0.5 to 15 μm, and especially 1 to 12 μm.

The white layers preferably exhibit a Transmission Optical Density (TOD) in the range from 0.4 to 1.75, more preferably 0.6 to 1.3, particularly 0.7 to 1.1, and especially 0.8 to 1.0. The aforementioned TOD ranges are particularly applicable to a 60 μm thick white layer. The white layer is conveniently rendered white by incorporation therein of an effective amount of a whitening agent. Suitable whitening agents include a particulate inorganic filler, an incompatible resin filler, or a mixture of two or more such fillers.

Particulate inorganic fillers suitable for generating a white layer include conventional inorganic pigments and fillers, and particularly metal or metalloid oxides, such as alumina, silica and titania, and alkaline metal salts, such as the carbonates and sulphates of calcium and barium. Suitable inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the white layer polymer.

Suitable particulate inorganic fillers may be of the non-voiding or voiding type. By voiding is meant comprising a cellular structure containing at least a proportion of discrete, closed cells. Barium sulphate is an example of a filler which results in the formation of voids. Titanium dioxide may be of the voiding or non-voiding type, dependant upon the particular type of titanium dioxide employed. In a preferred embodiment of the invention, a white layer comprises titanium dioxide or barium sulphate, and particularly a mixture thereof.

The amount of inorganic filler incorporated into the white layers desirably should be not less than 5% nor exceed 60% by weight, based on the weight of the white layer polyester. Particularly satisfactory levels of whiteness are achieved when the concentration of filler is preferably in the range from 10% to 55%, more preferably 15% to 50%, particularly 20% to 45%, and especially 25% to 35% by weight, based on the weight of the white layer polyester. In a particularly preferred embodiment of the invention, the white layer comprises a mixture of titanium dioxide and barium sulphate particles, preferably present in a weight ratio in the range from 3 to 0.3:1, more preferably 2 to 0.5:1, particularly 1.5 to 0.7:1, and especially 1.1 to 0.9:1.

The titanium dioxide filler particles may be of anatase or rutile crystal form. The titanium dioxide particles preferably comprise a major portion of anatase, more preferably at least 60% by weight, particularly at least 80%, and especially approximately 100% by weight of anatase. The particles can be prepared by standard procedures, such as using the chloride process, or preferably by the sulphate process.

In one embodiment of the invention, the titanium dioxide particles are coated, preferably with inorganic oxides such as aluminium, silicon, zinc, magnesium or mixtures thereof. Preferably the coating additionally comprises an organic compound, such as a fatty acid and preferably an alkanol, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

The individual or primary titanium dioxide particles suitably have a mean crystal size, as determined by electron microscopy, in the range from 0.05 to 0.4 µm, preferably 0.1 to 0.3 µm, and more preferably 0.2 to 0.25 µm. In a preferred embodiment of the invention, the primary titanium dioxide particles aggregate to form clusters or agglomerates comprising a plurality of titanium dioxide particles. The aggregation process of the primary titanium dioxide particles may take place during the actual synthesis of the titanium dioxide and/or during the polyester and/or polyester film making process.

The inorganic filler, suitably aggregated titanium dioxide and/or barium sulphate, preferably has a volume distributed median particle diameter (equivalent spherical diameter corresponding to 50% of the volume of all the particles, read on the cumulative distribution curve relating volume % to the diameter of the particles—often referred to as the "D(v, 0.5)" value) in the range from 0.1 to 1.5 µm, more preferably 0.2 to 1.2 µm, particularly 0.4 to 1.0 µm, and especially 0.6 to 0.9 µm.

It is preferred that none of the filler particles incorporated into the white layer should have an actual particle size exceeding 20 µm. Particles exceeding such a size may be removed by sieving processes which are known in the art. However, sieving operations are not always totally successful in eliminating all particles greater than a chosen size. In practice, therefore, the size of 99.9% by number of the particles should not exceed 20 µm. Most preferably the size of 99.9% of the particles should not exceed 10 µm. Preferably at least 90%, more preferably at least 95% of the filler particles, are within the range of the volume distributed median particle diameter±0.5 µm, and particularly ±0.3 µm.

Particle size of the filler particles described herein may be measured by electron microscope, coulter counter, sedimentation analysis and static or dynamic light scattering. Techniques based on laser light diffraction are preferred. The median particle size may be determined by plotting a cumulative distribution curve representing the percentage of particle volume below chosen particle sizes and measuring the 50th percentile. The volume distributed median particle diameter of the filler particles is suitably measured using a Malvern Instruments Mastersizer MS 15 Particle Sizer after dispersing the filler in ethylene glycol in a high shear (eg Chemcoll) mixer.

By an "incompatible resin" is meant a resin which either does not melt, or which is substantially immiscible with the polyester, at the highest temperature encountered during extrusion and fabrication of the white layer. Such resins include polyamides and olefin polymers, particularly a homo- or co-polymer of a mono-alpha-olefin containing up to 6 carbon atoms in its molecule, for incorporation into polyester films. Preferred materials, particularly for incorporation into a polyethylene terephthalate white layer, include an olefin polymer, such as a low or high density homopolymer, particularly polyethylene, polypropylene or poly-4-methylpentene-1, an olefin copolymer, particularly an ethylene-propylene copolymer, or a mixture of two or more thereof. Random, block or graft copolymers may be employed.

Dispersibility of the aforementioned olefin polymer in a white layer may be inadequate to confer the desired characteristics. Therefore a dispersing agent is preferably incorporated together with the olefin polymer softening agent. The dispersing agent conveniently comprises a carboxylated polyolefin, particularly a carboxylated polyethylene. Suitable carboxylated polyolefins include those having a Brookfield Viscosity (140° C.) in the range 150–100000 cps (preferably 150–50000 cps) and an Acid Number in the range 5–200 mg KOH/g (preferably 5–50 mg KOH/g), the Acid Number being the number of mg of KOH required to neutralise 1 g of polymer.

The amount of dispersing agent may be selected to provide the required degree of dispersibility, but conveniently is in the range from 0.05% to 50%, preferably 0.5% to 20% by weight, based on the weight of the olefin polymer.

The amount of incompatible resin filler present in a white layer is preferably in the range from 2% to 30%, more preferably 3% to 20%, particularly 4% to 15%, and especially 5% to 10% by weight, based on the weight of the white layer polyester.

In one embodiment of the invention, a white layer comprises an optical brightener. An optical brightener may be included at any stage of the polymer or polymer film production. Preferably, the optical brightener is added to the glycol, or alternatively by subsequent addition to the polyester prior to the formation of the polyester film, eg by injection during extrusion. The optical brightener is preferably added in amounts in the range from 50 to 1500 ppm, more preferably 100 to 1000 ppm, particularly 200 to 600 ppm, and especially 250 to 350 ppm by weight, relative to the weight of the white layer polyester. Suitable optical brighteners include those available commercially under the trade names "Uvitex" MES, "Uvitex" OB, "Leucopur" EGM and "Eastobrite" OB-1.

The components of the dark layer and/or white layer compositions may be mixed together in a conventional manner. For example, by mixing with the monomeric reactants from which the polyester is derived, or the components may be mixed with the polyester by tumble or dry blending or by compounding in an extruder, followed by cooling and, usually, comminution into granules or chips. Alternatively, masterbatching technology may be employed.

The surface of a white layer preferably has the following CIE laboratory colour co-ordinate values for L*, a* and b*, measured as herein described. The L* value is suitably greater than 85, preferably in the range from 90 to 100, more preferably 93 to 99, and particularly 95 to 98. The a* value is preferably in the range from −2 to 3, more preferably −1 to 2, particularly 0 to 1.5, and especially 0.3 to 0.9. The b* value is preferably in the range from −10 to 0, more preferably −10 to −3, particularly −9 to −5, and especially −8 to −7.

The colour co-ordinate values may be modified by the incorporation of suitable dyes, such as a blue and/or magenta dye(s), into the film-forming polyester of the white layers. For example a blue dye may be used, preferably at a concentration in the range from 10 to 1000 ppm, more preferably 30 to 500 ppm, particularly 50 to 200 ppm, and especially 100 to 150 ppm, relative to the weight of the white layer polyester. Alternatively, or in addition, a magenta dye may be employed, preferably at a concentration in the range from 2 to 200 ppm, more preferably 4 to 100 ppm, particularly 7 to 50 ppm, and especially 10 to 15 ppm, relative to the weight of the white layer polyester.

The surface of a white layer preferably exhibits a whiteness index, measured as herein described, in the range from 80 to 120, more preferably 85 to 110, particularly 90 to 105, and especially 95 to 100 units.

The thickness of a white layer is preferably in the range from 0.1 to 50 μm, more preferably 0.2 to 20 μm, particularly 0.5 to 15 μm, and especially 1 to 12 μm.

The layers of a polyester film may, if desired, contain any of the additives conventionally employed in the manufacture of polymeric films. Thus, agents such as dyes, pigments, voiding agents, lubricants, anti-oxidants, anti-blocking agents, surface active agents, slip aids, gloss improvers, prodegradants, flame retardants, ultra-violet light stabilisers, viscosity modifiers and dispersion stabilisers may be incorporated as appropriate.

In the embodiment of the invention which is concerned with the absorption and reflection of ultraviolet wavelengths in order to distinguish the respective layers, the layers of each type comprise different levels of one or more UV absorber(s). The UV absorber(s) may be any known to those skilled in the art which are compatible with the other materials used in the preparation of the multilayer films of the present invention. The UV absorber may absorb substantially all wavelengths in the ultraviolet region of the electromagnetic spectrum, or substantially all wavelengths within a selected band of wavelengths within the ultraviolet region. In the preferred embodiment of the invention wherein there are only two types of layers, type A and type B, a layer of type A comprises substantially no UV absorber, while a layer of type B comprises a UV absorber in an amount effective to distinguish it from a layer of type A when analysed using a suitable UV source and detector.

In principle, any organic or inorganic UV absorber, particularly one which is suitable for use with polyester, may be employed in the present invention. Suitable examples include the organic UV absorbers disclosed in Encyclopaedia of Chemical Technology, Kirk-Othmer, Third Edition, John Wiley & Sons, Volume 23, Pages 615 to 627. Particular examples of UV absorbers include benzophenones, benzotriazoles (US4684679, U.S. Pat. No. 4,812,498 and U.S. Pat. No. 4,681,905), benzoxazinones (U.S. Pat. No. 4,446,262, U.S. Pat. No. 5,251,064 and U.S. Pat. No. 5,264,539) and triazines (U.S. Pat. No. 3,244,708, U.S. Pat. No. 3,843,371, U.S. Pat. No. 4,619,956, U.S. Pat. No. 5,288,778 and WO 94/05645). The teaching of the aforementioned documents is incorporated herein by reference. Preferably, the UV absorber is non-volatile and does not cause excessive yellowing of the product.

In one embodiment of the invention, a UV absorber may be chemically incorporated in the chain of a layer-forming polyester. Preferred UV-stable polyesters are produced by incorporating benzophenones into the polyester, for example as described in EP-A-0006686, EP-A-0031202, EP-A-0031203 and EP-A-0076582, the teaching of which is incorporated herein by reference.

In a preferred embodiment of the invention, the UV absorber comprises one or more triazines, more preferably hydroxyphenyltriazines, and particularly hydroxyphenyltriazine compounds of Formula 1:

wherein R is hydrogen, $C_1$–$C_{18}$ alkyl, $C_2$–$C_6$ alkyl substituted by halogen or by $C_1$–$C_{12}$ alkoxy, or is benzyl and $R^1$ is hydrogen or methyl. R is preferably $C1$-$C_{12}$ alkyl or benzyl, more preferably $C_3$–$C_6$ alkyl, and particularly hexyl. $R^1$ is preferably hydrogen. An especially preferred UV absorber is 2-(4,6-diphenyl-1,3,5-triazin-2-yl)-55 (hexyl) oxy-phenol, which is commercially available as Tinuvin™ 1577 FF from CibaAdditives. Further examples of a preferred UV absorber are benzylidene malonate ester (commercially available as Sanduvor™ PR-25 from Sandoz), and benzoxazinone (commercially available as Cyasorb™ 3638 from Cytec).

Suitable inorganic UV absorbers include metal oxide particles, such as zinc oxide or titanium dioxide. Titanium dioxide particles, such as those previously described herein, are particularly preferred.

The amount of UV absorber incorporated into a layer is generally in the range from 0.1% to 10%, more preferably 0.5% to 9%, more preferably 1.2% to 8%, particularly 2% to 6%, and especially 3.2% to 5.5% by weight, relative to the weight of the polymer of that layer. In one embodiment of the invention, both an organic UV absorber, preferably a triazine, and an inorganic UV absorber, preferably titanium dioxide, are present. The ratio, by weight of inorganic to organic UV absorber is preferably in the range from 0.5 to 10:1, more preferably 1 to 5:1, and particularly 1.5 to 2.5:1.

In a further embodiment of the invention, each type of layer may incorporate a differently coloured pigment. In this embodiment, the layers of each type in the multilayer film are distinguishable since each type of layer would reflect light of different wavelengths in the visible region of the electromagnetic spectrum. Alternatively, each type of layer may incorporate a different UV absorber which absorbs UV light at different wavelengths in the ultraviolet region of the electromagnetic spectrum. It is also possible to combine in a multilayer film (i) layers of a type which reflects selected wavelengths, or substantially all wavelengths, of visible light, and (ii) layers of a type which reflects selected wavelengths, or substantially all wavelengths, of ultraviolet light. In this case, of course, it would be necessary to optically scan the film over wavelengths in both the visible and ultraviolet region of the electromagnetic spectrum. In this way, it is possible to generate highly complex layer structures and therefore to generate complex security codes and to store greater amounts of information.

The multilayer films may also comprise an ink-receptive coating. The ink-receptive coating improves the adhesion of ink to the film and increases the range of inks that can be readily applied to the surface. The ink-receptive coating may be any such coating well-known to those skilled in the art. For example, the ink-receptive coating may comprise an acrylic component and a cross-linking component (e.g. melamine formaldehyde), such as the coating disclosed in EP-A-0429179, the disclosure of which is incorporated herein be reference.

As noted above, the film structure of the multilayer films may be converted into a code, such as a mathematical code, and it is therefore possible to encode such a film with electronically-readable information, for retrieval as and when required. The retrieval of the information may be achieved by optically scanning the cross-section of the film using an electronic scanner. One method of reading the film structure is to take a micrograph of the cross-section of the film, for instance using a microscope. The micrograph is then digitised, i.e. converted into mathematical code, by breaking up the micrograph into pixels and analysing it, according to techniques known in the art. The mathematical code is then correlated with a code stored in a local or remote database and the required information retrieved. It is, however, preferred that the multilayer film be scanned and digitised in one operation.

According to a further aspect of the present invention there is provided a multilayer film comprising a plurality of white layers and a plurality of dark layers, per se, as described herein.

According to a further aspect of the present invention there is provided a method of storing information, the method comprising the steps of:
  (i) providing a multilayer film comprising at least two different types of layer, wherein each type of layer exhibits a different optical property and wherein the multilayer film comprises a plurality of layers of each of at least two of the different types of layer;
  (ii) converting the multilayer structure of the film into a code by optically scanning the cross-section of the film along an edge thereof;
  (iii) assigning the code to one or more items of information; and
  (iv) optionally providing a database comprising one or more items of information and the codes assigned thereto.

According to a further aspect of the present invention there is provided a method of retrieving stored information, the method comprising the steps of:
  (i) providing a multilayer film comprising at least two different types of layer, wherein each type of layer exhibits a different optical property and wherein the multilayer film comprises a plurality of layers of each of at least two of the different types of layer;
  (ii) interrogating the multilayer film by optically scanning the cross-section of the film along an edge thereof and converting the multilayer structure into a code,
  (iii) correlating the code with one or more items of information; and
  (iv) optionally providing a database comprising one or more items of information and the codes assigned thereto.

According to a further aspect of the present invention there is provided a method of protecting against counterfeiting or fraud, the method comprising the steps of:
  (i) providing a multilayer film comprising at least two different types of layer, wherein each type of layer exhibits a different optical property and wherein the multilayer film comprises a plurality of layers of each of at least two of the different types of layer;
  (ii) converting the multilayer structure of the film into a first code by optically scanning the cross-section of the film along an edge thereof;
  (iii) optionally assigning the first code to one or more items of information;
  (iv) storing the first code, and optionally the information assigned thereto, in a database;
  (v) interrogating the multilayer film by optically scanning the cross-section of the film along an edge thereof and converting the multilayer structure into a second code; and
  (vi) correlating the second code so obtained with the first code held in the database.

In the methods described herein, the code may be a mathematical code or other representative code.

Figure 1:
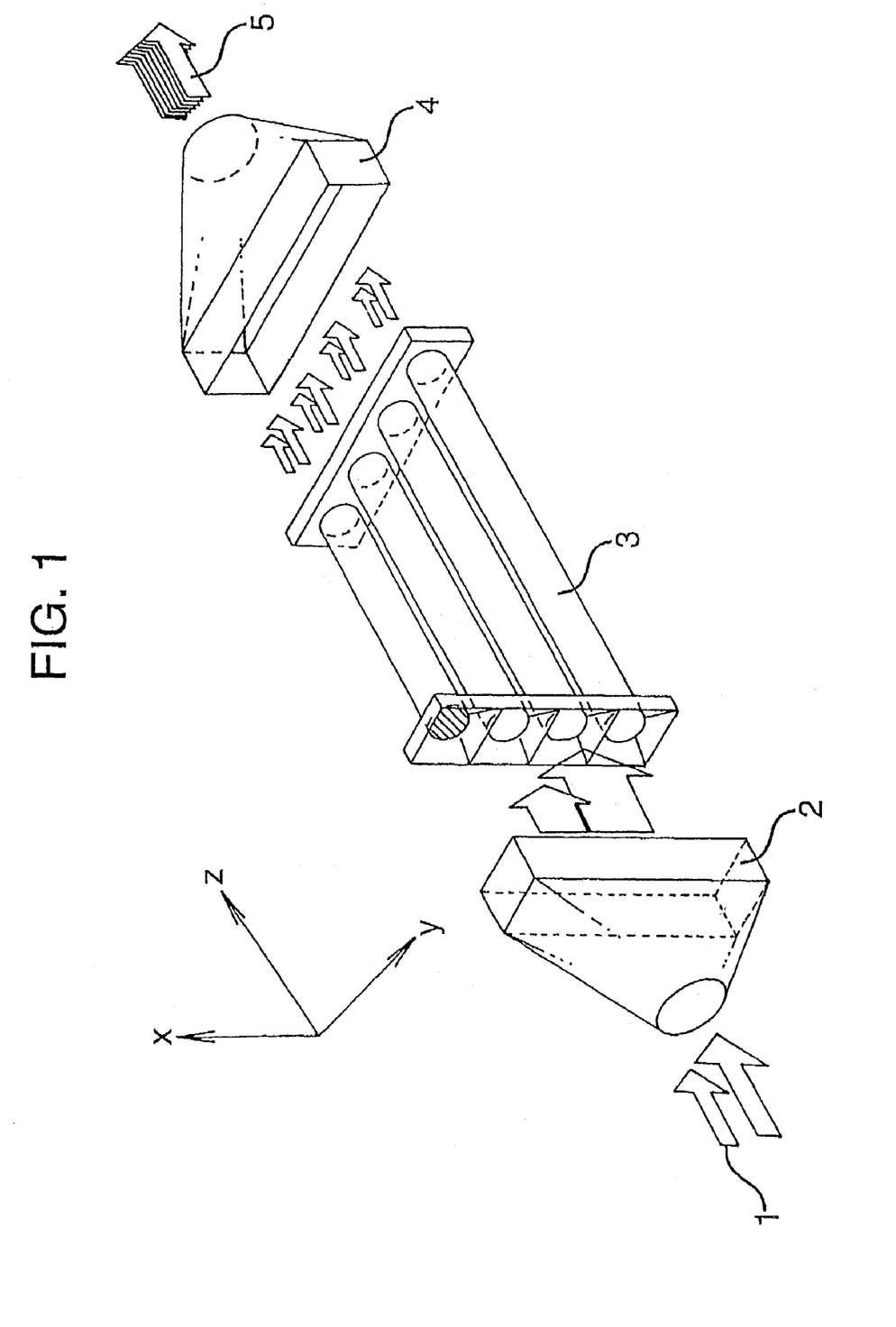
FIG. 1 is a schematic illustration of a layer-multiplying arrangement which may be used to manufacture the multilayer films.

Referring to FIG. 1, a two layer composite melt stream (1) is passed to a coextrusion block (2) and then passed through a four-lane layer multiplier (3). The polymeric material is then passed to the die (4) to provide an eight layer composite stream (5).

Figure 2:
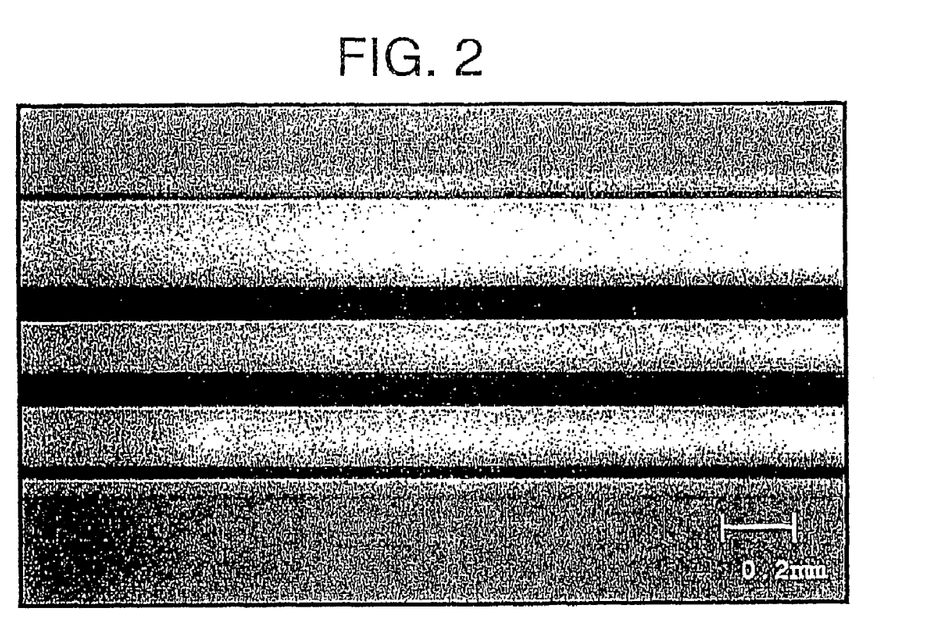
FIG. 2 is a micrograph of a cross-section of a cast multilayer film.
Figure 3:
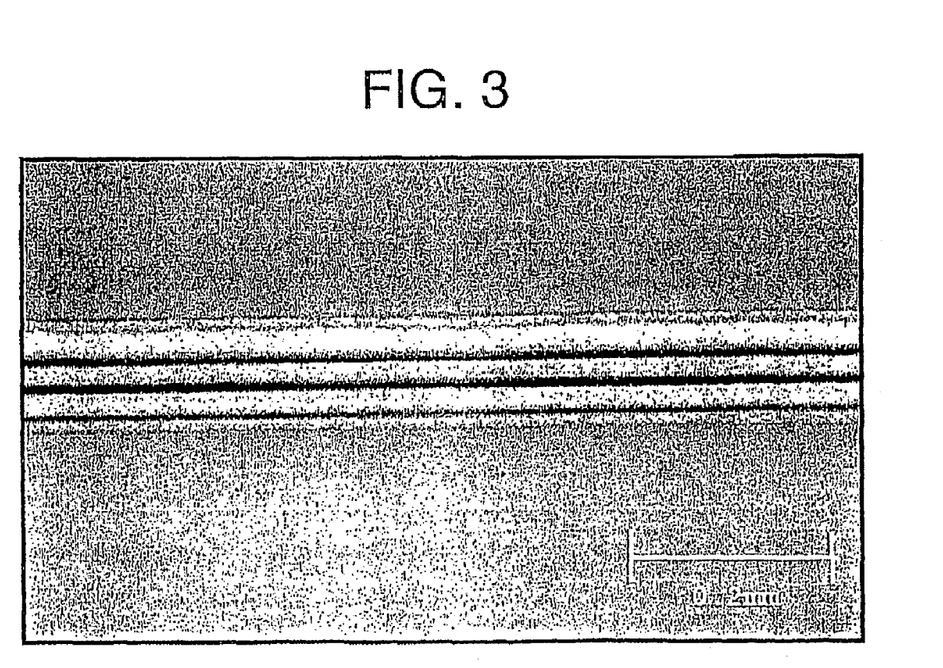
FIG. 3 is a micrograph of a cross-section of an oriented multilayer film.
Figure 4:
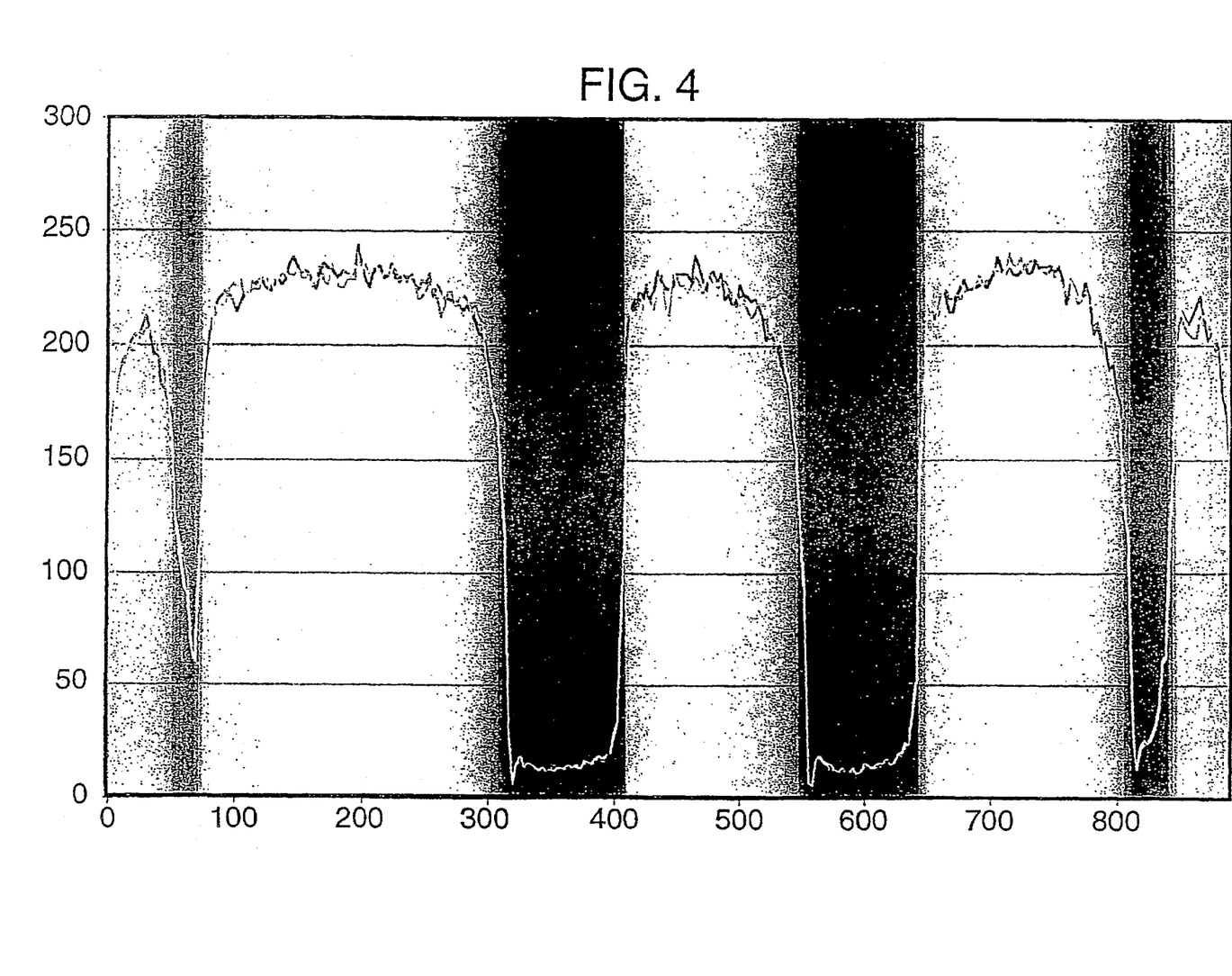
FIG. 4 is the micrograph of FIG. 2 onto which has been superimposed a plot of the brightness profile (or RGB values) obtained by digitising the micrograph according to the procedure described herein.

Referring to FIGS. 2, 3 and 4, the micrographs clearly show the alternating white and dark layers of the multilayer films. In FIG. 4 the x axis is in microns and the y axis represents brightness.

In this specification the following test methods have been used to determine certain properties of the film:
  (i) Transmission Optical Density (TOD) of the film was measured using a Macbeth Densitometer TR 927 (obtained from Dent and Woods Limited, Basingstoke, UK) in transmission mode.
  (ii) $L^*$, $a^*$ and $b^*$ colour co-ordinate values (CIE (1976)) and whiteness index of the external surface of the white layer were measured using a Colorgard System 2000, Model/45 (manufactured by Pacific Scientific) based on the principles described in ASTM D313.

The invention is further illustrated by reference to the following examples. All parts and percentages are by weight unless otherwise indicated.

EXAMPLE

Film Preparation

A 12 layer film of structure (BABBABBABBAB; where B a white layer and A=a grey layer) having a thickness of 100 μm was prepared by passing through a layer multiplication device a three layer white/grey/white composition formed by a conventional coextrusion process.

The twelve layer film was produced using a conventional polyester film manufacturing line. Two extruders were used to produce the film. A white polymer comprising 20% titanium dioxide was extruded in the main extruder, which polymer comprised approximately 62% of the total film by weight. A grey polymer comprising 20% titanium dioxide and 0.5% carbon black was extruded in the coextruder and comprised about 38% of the total film by weight. Both of these polymer blends were made by blending unfilled PET with masterbatches.

Once the polymers had been extruded independently, the melt streams were passed through a junction block which puts the melts in the order of BAB, with B being the white layers and grey being the A layers. A "cam-type" injection block was then used to bring the melt streams into contact in the desired order of BAB. The resulting composite 3 layer melt stream was then passed through two melt splitters giving a final structure of BABBABBABBAB. This 12 layer melt stream was then extruded onto a chilled cast roll using a conventional die. The film was then sequentially drawn about 3.0 times in the machine direction at 80° C. and about 3.3 times in the transverse direction at 110° C.

The white and grey layers of both the cast film and the oriented film were viewed in cross-section under a microscope and micrographs obtained (see FIGS. 2 and 3). The images were "digitised" using the procedure described below.

Film Analysis

An image on a PC is composed of a number of small points of colour or pixels. Closer inspection of a small section of an image reveals a collection of pixels. Each pixel is defined using RGB (Red Green Blue) values which dictate the amount of red, green and blue used to make up the pixel's colour. These values are in the range 0 to 255. In the case of a greyscale ("black and white") image, the pixels are shades of grey and consequently equal amounts of red, green and blue are used to present each pixel's colour. By taking any one of the RGB values for a pixel on a greyscale image one is effectively examining the brightness of that point on the image represented by a value in the range 0 (black) to 255 (white).

The following method was used to distinguish the layers of the film:

1. A magnified edge-on image of the film was taken and stored on a PC in Tagged Image File format (TIFF). TIFF is a standard bitmap image format which contains formatting information in addition to the pixel colour information. The image was converted into Raw Data Format (Raw) (using Paintshop Pro) in order to access the pixel colour information. The Raw format stores the image as a series of 8 bit binary values representing each of the pixel's RGB values. 8 bits (a byte) can represent a denary value between 0 and 255 and can therefore represent the RGB values of a pixel. A 3-channel (colour) image would use 3 bytes per pixel but a greyscale image would only use one byte per pixel. For example, the first 5 pixels and hence 5 bytes (8 bits =I byte) of a greyscale raw data file might look like the example below.

E.g. 10010001 00001000 01000010 000010001 111000 01 . . .

2. A one pixel wide sample area was chosen from the image.
3. A Visual Basic application was used to convert the binary Raw data file into a text file to hold the denary values represented by each of the bytes in the raw file.
4. Excel 97 allows data held in a text file to be read into a spreadsheet from where it can be used to plot a chart. A mathematical filter may be used to convert the text file into a bar code.

The Example demonstrates that it is possible to encode a multilayer film with electronically-readable information. In order to generate more unique security codes, the structure of the film can, of course, be varied to provide a much more complicated structure than that of the simple 12-layer film of the Example.

The invention claimed is:

1. A method of storing information in a multilayer film, the method comprising forming a multilayer film comprising a plurality of layers wherein the plurality of layers comprises at least two layers having a difference from each other in regard to an optical property, said difference forming a pattern across the thickness of the multilayer film at an internal cross section thereof, wherein said information is in the form of a barcode and said pattern defines the barcode.

2. The method of claim 1, wherein the optical property is reflectivity to incident light.

3. The method of claim 1, wherein the optical property is reflectivity to incident visible light.

4. The method of claim 1, wherein the optical property is reflectivity to substantially all wavelengths of incident visible light.

5. The method of claim 1, wherein one or more layers comprise a polyester.

6. The method of claim 5, wherein the dicarboxylic acid component of the polyester is terephthalic acid.

7. The method of claim 5, wherein the diol component of the polyester is ethylene glycol.

8. The method of claim 1, wherein the film comprises only two types of layer in regard to the optical property.

9. The method of claim 8, wherein the film comprises a plurality of white layers and a plurality of dark layers.

10. The method of claim 9, wherein a dark layer comprises in the range from 0.05% to 10% by weight of an opacifying agent, based on the weight of the dark layer.

11. The method of claim 10, wherein the opacifying agent comprises carbon black.

12. The method of claim 9, wherein the external surface of a dark layer exhibits a CIE laboratory colour coordinate L* value in the range from 10 to 60.

13. The method of claim 9, wherein a white layer comprises in the range from 5% to 60% by weight of a whitening agent, based on the weight of the white layer.

14. The method of claim 9, wherein the surface of a white layer exhibits a CIE laboratory colour coordinate value L* greater than 85.

15. The method of claim 9, wherein the surface of a white layer exhibits a whiteness index in the range from 80 to 120 units.

16. The method of claim 1, wherein the multilayer film is a coextruded film.

17. The method of claim 1, wherein said at least two layers comprise at least two polyester layers.

18. The method of claim 1, further comprising stacking a plurality of the multilayer films.

19. A security or anticounterfeiting device comprising a multilayer film comprising a plurality of layers, wherein the plurality of layers comprises at least two layers having a difference from each other in regard to an optical property, said difference forming a pattern across the thickness of the multilayer film at an internal cross section thereof, wherein information is present in the device in the form of a barcode and said pattern defines the barcode.

20. A multilayer film according to claim 19 containing a plurality of white layers and a plurality of dark layers.

21. A device according to claim 19 in which the multilayer film contains a plurality of white layers and a plurality of dark layers.

22. A method of storing information, the method comprising the steps of:
  (i) providing a multilayer film comprising at least two different types of layer having a difference from each other in regard to an optical property, wherein the multilayer film comprises a plurality of said at least two different types of layer ordered within the film such that said difference in said optical property forms a pattern across the thickness of the multilayer film at an internal cross section thereof, thereby forming a barcode;
  (ii) converting the multilayer structure of the film into code by optically scanning the cross-section of the film along an edge thereof; and
  (iii) assigning the code to one or more items of information.

23. The method of claim 22, further comprising
  (iv) entering one or more items of said information and the codes assigned thereto into a database.

24. A method of retrieving stored information, the method comprising the steps of:
  (i) providing a multilayer film comprising at least two different types of layer having a difference from each other in regard to an optical property, wherein the multilayer film comprises a plurality of said at least two of the different types of layer ordered within the film such that said difference in said optical property forms a pattern across the thickness of the multilayer film at an internal cross section thereof, thereby forming a barcode;
  (ii) interrogating the multilayer film by optically scanning the cross section of the film along an edge thereof and converting the multilayer structure into a code; and
  (iii) correlating the code with one or more items of information.

25. The method of claim 24, further comprising
  (iv) entering one or more items of said information and the codes assigned thereto into a database.

26. A method of protecting against counterfeiting or fraud, the method comprising the steps of:
  (i) providing a multilayer film comprising at least two different types of layer having a difference from each other in regard to an optical property, wherein the multilayer film comprises a plurality of said at least two of the different types of layer ordered within the film such that said difference in said optical property forms a pattern across the thickness of the multilayer film at an internal cross section thereof, thereby forming a barcode;
  (ii) converting the multilayer structure of the film into a first code by optically scanning the cross-section of the film along an edge thereof;
  (iii) storing the first code in a database;
  (iv) interrogating the multilayer film by optically scanning the cross section of the film along an edge thereof and converting the multilayer structure into a second code; and
  (vi) correlating the second code so obtained with the first code held in the database.

27. The method of claim 26, further comprising assigning the first code to one or more items of information and storing the information in the database.

28. A method of storing information in the form of a barcode, the method comprising forming a multilayer film comprising a plurality of layers each comprising a film-forming polymer, wherein the plurality of layers comprises at least two layers having a difference from each other in regard to an optical property, said difference forming a pattern across the thickness of the multilayer film at an internal cross section thereof, said pattern consisting of substantially parallel lines coinciding with the layers and defining the barcode.

29. The method of claim 28, wherein each of the plurality of layers comprises the same film-forming polymer.

30. The method of claim 29, wherein the multilayer film is a coextruded film.

31. The method of claim 29, wherein said at least two layers comprise at least two polyester layers.

32. A method of retrieving information in a multilayer film, the method comprising reading a barcode in a multilayer film comprising a plurality of layers each comprising a film-forming polymer, wherein the plurality of layers comprises at least two layers having a difference from each other in regard to an optical property, said difference forming a pattern across the thickness of the multilayer film at an internal cross section thereof, said pattern consisting of substantially parallel lines coinciding with the layers and defining the barcode.

33. The method of claim 32, wherein each of the plurality of layers comprises the same film-forming polymer.

34. The method of claim 33, wherein the multilayer film is a coextruded film.

35. The method of claim 33, wherein said at least two layers comprise at least two polyester layers.

36. A method of retrieving information in a multilayer film, the method comprising reading a barcode in a multilayer film comprising a plurality of layers, wherein the plurality of layers comprises at least two layers having a difference from each other in regard to an optical property, said difference forming a pattern across the thickness of the multilayer film at an internal cross section thereof, wherein said information is in the form of a barcode and said pattern defines the barcode.

37. The method of claim 36, wherein the optical property is reflectivity to incident light.

38. The method of claim 36, wherein the optical property is reflectivity to incident visible light.

39. The method of claim 36, wherein the optical property is reflectivity to substantially all wavelengths of incident visible light.

40. The method of claim 36, wherein one or more layers comprise a polyester.

41. The method of claim 40, wherein the dicarboxylic acid component of the polyester is terephthalic acid.

42. The method of claim 40, wherein the diol component of the polyester is ethylene glycol.

43. The method of claim 36, wherein the film comprises only two types of layer in regard to the optical property.

44. The method of claim 43, wherein the film comprises a plurality of white layers and a plurality of dark layers.

45. The method of claim 44, wherein a dark layer comprises in the range from 0.05% to 10% by weight of an opacifying agent, based on the weight of the dark layer.

46. The method of claim 45, wherein the opacifying agent comprises carbon black.

47. The method of claim 44, wherein the external surface of a dark layer exhibits a CIE laboratory colour coordinate L* value in the range from 10 to 60.

48. The method of claim 44, wherein a white layer comprises in the range from 5% to 60% by weight of a whitening agent, based on the weight of the white layer.

49. The method of claim 44, wherein the surface of a white layer exhibits a CIE laboratory colour coordinate value L* greater than 85.

50. The method of claim 44, wherein the surface of a white layer exhibits a whiteness index in the range from 80 to 120 units.

51. The method of claim 36, wherein the multilayer film is a coextruded film.

52. The method of claim 36, wherein said at least two layers comprise at least two polyester layers.

53. The method of claim 36, further comprising stacking a plurality of the multilayer films.

* * * * *